Patented June 21, 1938

2,121,160

UNITED STATES PATENT OFFICE 2,121,160

METHOD OF PREPARATION AND USE OF METALLIC OXIDES AND SOLID FUELS

Charles Campbell Morfit, Brooklyn, and Ralph H. Sweetser, New York, N. Y.

No Drawing. Application March 10, 1934, Serial No. 714,998

3 Claims. (Cl. 75—40)

The present invention relates to the reduction of ore and has for an object to provide a method of procedure whereby fine ground ore may be effectively reduced.

Another object is to provide a method whereby fine pulverized fuel may be used in the reduction of ores.

The invention provides a method whereby the ore and fuel and preferably also the flux are combined in the form of briquets and then reduced in a blast furnace or other type of furnace, cupola or oven.

The invention has been developed more particularly to provide an improved method for reducing iron oxides and will be described more particularly as bearing on such ores but the application of the principles involved is not limited thereto.

Some ore deposits are of such a character that when the ore is mined a large proportion of it is in granular condition and difficult to reduce by usual methods. Much ore of this type is discarded as not profitably workable. Other ores can be more profitably reduced if they can first be concentrated as by first pulverizing and then separating the good ore. In the case of iron oxides magnetic separation is effective and economical. Such granular and pulverulent ores, are not readily reduced by usual methods. Attempts have been made to reduce them but such attempts tend to result in the choking of the furnace and the prevention of the free passage of gases through the furnace. Satisfactory heat transfer is also difficult to obtain. For the same and other reasons the use of pulverulent or granular fuel has not been considered feasible. According to present practice screened high temperature coke of a structure sufficiently strong to withstand the weight of the charge is most commonly used for ore reduction, although anthracite and charcoal have also been used. Occasionally, especially in emergency, coke breeze and other fuel screenings have been used but the results have been unsatisfactory and for the most part fuel in smaller sizes has been considered unsatisfactory for the purposes of ore reduction.

Fuel has been briquetted for use with ore and some attempt has been made to use briquetted ore but the results have not been satisfactory. The net result has been that fine fuel and ore have been considered not good for the production of iron and other metals.

Another disadvantage found in the reduction of ores according to the present methods is the high excess of fuel used over that theoretically necessary for reduction. Such excess involves both the waste of fuel and a resultant high carbon in the pig. In order to make steel from such pig iron, it is necessary to reduce the content of the carbon, which usually involves a substantial cost for extra fuel and additional time for the process.

Steel and iron reduced by the use of charcoal have certain desirable qualities. It is believed that each fuel has a certain temperature at which the reduction takes place most effectively and that this temperature is different for fuels of different types. It is believed that the degree of activation of the fuel and the intimacy of the contact with the small particles of ore to be produced determines the quality of the product of reduction and the time required for complete reduction. Probably for this reason a highly activated charcoal when used in a blast furnace produces a better grade of pig iron than does the high temperature coke which is slightly activated. It is believed also that reaction at low temperatures is made possible by the use of highly activated carbon with the result that a pig with a substantially less carbon content can be produced.

It is one of the advantages of the invention that by proper selection of fuels and proportions of the fuel, ore and flux and by the proper regulation of heat additionally applied, if any, the reduction may be carried on at the temperatures most effective and particularly objectionably high temperatures heretofore occurring can be avoided. Pig with a low carbon content can be assured by operation at the low temperatures. While the melting point must be reached to produce the actual pig, the reduction of the ore in the briquets as prepared in accordance with the invention begins at a much lower temperature. Certain experiments indicate that reduction may begin even at temperatures of the order of 200° C. or even lower.

The present invention accomplishes several improvements. In the preferred embodiment the fuel and the ore and preferably also the flux and any other materials added for their physical or chemical effects are intimately mixed to facilitate the reduction and formed into briquets strong enough to withstand the pressures to which they will be subjected in the particular furnace or the like in which the reduction is to be carried on. This makes possible effective reduction of granular or pulverulent ores while using similar or coarser fuel including culm, screenings, and other forms.

The process of the invention is applicable to fuels commonly classed as caking and those classed as non-caking, also to fuels which have been carbonized or semi-carbonized or activated, by either the high or low temperature methods. The fuels may be used in their dried or natural state. A wide variety of fuels are suitable including anthracite, bituminous, peat, charcoal and others. The ore and the fuel are combined in suitable proportions, as, for example, 4 parts of ore with from 1 to 2 parts of fuel by weight. The best proportions probably approximate 4 parts ore to 1 part of fuel, but depend upon the preferred temperatures for the reduction of the particular ore treated and the quality of the iron desired in the pig. Preferably also a suitable flux is combined in the briquets with the ore and fuel in the proportions necessary. The flux may approximate 1 to 2 parts for 6 parts of ore.

The fineness of the several materials used in the briquet may vary over a wide range. Fine ore ground to pass through 100 mesh or finer for the purposes of magnetic separation is entirely suitable and so too is the fuel of comparable fineness. On the other hand ore such as obtained from natural deposits or as screenings and which may comprise particles of even a quarter or half inch in diameter can be combined with fine fuel screenings or with coarser fuel such as the smaller sizes of commercial coal including buckwheat, chestnut and the like. Larger sizes of both the fuel and ore are not to be excluded as impractical or as not contemplated as within the scope of the invention, but some of the advantages of the invention are not applicable if either is too coarse, though other advantages are obtained. The condition of the flux may also vary within wide limits. Any suitable flux may be used as in other methods of treatment of ore including, for example, fluorspar, limestone, burnt lime and the like. The combination of the ingredients in intimate relation is advantageous further in continuous treatment processes as compared with the batch charge processes.

The briquets may be of any suitable size, large enough to permit such draft or transmission of heat as is necessary in the particular type of reduction furnace and not too large for convenient handling or satisfactory charging in the furnace to be used. Probably briquets having their smallest diameter from 1 to 2 inches and their largest diameter from 2 to 6 inches will be found to be convenient, both for the purpose of forming the briquet and for effective use in the reduction furnace.

The method of forming the briquets may vary as conditions may require. Briquets to be used in furnaces of the blast furnace type must necessarily be strong enough to sufficiently support the weight of the charge, whereas in furnaces of other types it will be necessary merely that the briquets should be strong enough to withstand the impacts of handling and to sufficiently keep their shape in the furnace during combustion.

The pressure used in forming the briquets obviously may vary to suit the requirements. Usually a pressure of at least 2,000 or 3,000 lbs. per sq. in. will be used. There are certain definite advantages in the use of pressures of the order of 30,000 to 40,000 lbs. per sq. in. in that strong well-bound briquets can be formed in which the ingredients under such pressure constitute a binder in themselves. In some cases it will be necessary or desirable to introduce into the briquets a binder other than that supplied by the ore, fuel and flux. In such event binders such as asphalt oil refinery residuum, clay and such like may be used.

As will be obvious from the foregoing, the invention provides various improvements in addition to making possible and profitable the use of ore, fuel and other material in pulverulent or granular material. Better temperature control is made possible and a better product produced. The amount of fuel and the time of reduction are reduced. The method facilitates and renders especially advantageous the use of dried, semi-dried, carbonized, semi-carbonized, or activated fuels including peat, lignite and bituminous coals, with attendant advantages.

The foregoing particular description is illustrative but is not intended as defining the limits of the invention.

We claim:—

1. In the process of refining metal oxides the step which consists in forming a pulverulent mixture comprising principally metal oxide ore, activated carbon and flux into briquets under a pressure of 30,000 to 40,000 lbs. per sq. in.

2. The method of reducing metallic ores, which comprises fine grinding and intimate mixing of iron oxides, activated carbon, and flux and burning the same in a reduction furnace to produce molten pig iron.

3. The method of reducing metallic ores which comprises fine grinding and intimate mixing of a mixture consisting principally of ore, activated carbon and flux, compressing the mixture into suitable sized briquets and burning the same in a reduction furnace to produce molten pig iron.

CHARLES CAMPBELL MORFIT.
RALPH H. SWEETSER.